(12) United States Patent
Rajagopal et al.

(10) Patent No.: US 10,534,659 B2
(45) Date of Patent: Jan. 14, 2020

(54) POLICY BASED DYNAMIC DATA COLLECTION FOR PROBLEM ANALYSIS

(71) Applicant: International Business Machines Corporation, Armonk, NY (US)

(72) Inventors: Vinay G. Rajagopal, Bangalore (IN); Logeswaran T. Rajamanickam, Kunnathur (IN); Arun Ramakrishnan, Chennai (IN); Rohit S. Shetty, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/373,682

(22) Filed: Apr. 3, 2019

(65) Prior Publication Data

US 2019/0227862 A1 Jul. 25, 2019

Related U.S. Application Data

(63) Continuation of application No. 15/981,353, filed on May 16, 2018, which is a continuation of application
(Continued)

(51) Int. Cl.
*G06F 11/07* (2006.01)

(52) U.S. Cl.
CPC ........ *G06F 11/079* (2013.01); *G06F 11/0709* (2013.01); *G06F 11/0751* (2013.01); *G06F 11/0778* (2013.01); *G06F 11/0781* (2013.01)

(58) Field of Classification Search
CPC .... G06F 11/07; G06F 11/079; G06F 11/0709; G06F 11/0751
(Continued)

(56) References Cited

U.S. PATENT DOCUMENTS

| 7,043,660 B1 * | 5/2006 | Bolar ...................... H04L 41/06 714/4.5 |
| 7,653,633 B2 | 1/2010 | Villella |

(Continued)

FOREIGN PATENT DOCUMENTS

WO 2016161381 A1 10/2016

OTHER PUBLICATIONS

"Next-Gen Log Management", LogRhythm, 8 pages, printed on Apr. 1, 2016, © 2016 LogRhythm, Inc.,<https://logrhythm.com/products/log-management/>.
(Continued)

*Primary Examiner* — Kamini B Patel
(74) *Attorney, Agent, or Firm* — Aaron N. Pontikos

(57) ABSTRACT

A computer-implemented method includes receiving, from a first log agent, a first log collection. The computer-implemented method further includes receiving a first policy, wherein the first policy includes a definition of a first pattern and a definition of a procedure. The computer-implemented method further includes scanning the first log collection against the first policy to determine a match between a portion of the first log collection and the first pattern, with the matching portion of the first log collection being identified as a first data artefact. The computer-implemented method further includes, responsive to identifying the first data artefact, executing the procedure defined by the first policy, wherein the procedure includes: filtering the first log collection to yield a first group of filtered log entries, receiving a first data collection, and sending the first group of filtered log entries and the first data collection to a recipient system.

1 Claim, 4 Drawing Sheets

Related U.S. Application Data

No. 15/169,804, filed on Jun. 1, 2016, now Pat. No. 10,007,571.

(58) Field of Classification Search
USPC .......................................................... 714/37
See application file for complete search history.

(56) References Cited

U.S. PATENT DOCUMENTS

| | | | | |
|---|---|---|---|---|
| 7,778,979 | B2* | 8/2010 | Hatonen | G06F 11/3466 707/664 |
| 8,495,743 | B2* | 7/2013 | Kraemer | G06F 21/554 726/22 |
| 8,655,623 | B2* | 2/2014 | Duyanovich | G06F 11/0709 702/182 |
| 9,787,772 | B2* | 10/2017 | Holden | H04L 67/1097 |
| 9,858,559 | B2* | 1/2018 | Raleigh | G06Q 20/145 |
| 10,007,571 | B2 | 3/2018 | Rajagopal | |
| 9,973,534 | B2* | 5/2018 | Mahaffey | H04L 63/20 |
| 2005/0240943 | A1* | 10/2005 | Smith | G06F 9/465 719/328 |
| 2010/0306599 | A1* | 12/2010 | Cota-Robles | G06F 11/0784 714/48 |
| 2013/0262530 | A1* | 10/2013 | Collins | G06Q 40/08 707/812 |
| 2015/0046512 | A1* | 2/2015 | Ashby | H04L 43/08 709/203 |
| 2015/0143182 | A1* | 5/2015 | Rajamanickam | G06F 11/0781 714/48 |
| 2017/0005886 | A1 | 1/2017 | Dade | |
| 2017/0351559 | A1* | 12/2017 | Rajagopal | G06F 11/0781 |
| 2018/0260267 | A1 | 9/2018 | Rajagopal | |
| 2019/0259097 | A1* | 8/2019 | Raleigh | G06Q 40/025 |

OTHER PUBLICATIONS

"A SIEM that makes it easy to use logs for security,compliance, and troubleshooting", SolarWinds, Log Management and Log Analyzer Software, 8 pages, printed on Apr. 1, 2016, <http://www.solarwinds.com/log-event-manager.aspx>.

"Big Data—I like big data and I cannot lie", Splunk, 5 pages, printed on Apr. 1, 2016, © 2006-2016 Splunk Inc., <http://www.splunk.com/en_us/solutions/solution-areas/big-data.html>.

"Close your cyber threat gap with our advanced security", Tripwire, Advanced Cyber Threat Detection, Increased Security, 5 pages, printed on Apr. 1, 2016, © 2016 Tripwire, Inc., <http://www.tripwire.com/>.

"Configuration Guilde", Splunk®App for VMware, Splunk, 2 pages, printed on Apr. 1, 2016, © 2006-2016 Splunk Inc., <http://docs.splunk.com/DocumentationNMW/latest/Configuration/Filterlogdatacollection>.

"Flume 1.6.0 User Guide", Apache Flume™, 46 pages, printed on Apr. 1, 2016, <https://flume.apache.org/FlumeUserGuide.html>.

"Govern & Manage Rights", NetIQ, 5 pages, printed on Apr. 1, 2016, © 2016 Micro Focus, <https://www.netiq.com>.

"Intelligent log management on cloud from IBM", IBM Security, 3 pages, printed on Apr. 1, 2016, <http://www-03.ibm.com/security/services/security-event-log-management-service/index.html>.

"Ipswitch Log Management Suite", WhatsUpGold, Log Management & Network Monitoring, 10 pages, printed on Apr. 1, 2016, © 2016 Ipswitch, Inc., <http://www.whatsupgold.com/products/log-management.aspx>.

"Log management for protecting IT infrastructures and meeting compliance requirements", IBM Security, QRadar Log Manager, 2 pages, printed on Apr. 1, 2016, <http://www-03.ibm.com/software/products/en/qradar-log-manager/>.

"Log Management Tool", Loggly Product Tour, 18 pages, printed on Apr. 1, 2016, © 2016 Loggly, Inc., <https://www.loggly.com/product/>.

"Log Management", Alert Logic®, Compliance Solutions, 5 pages, printed on Apr. 1, 2016, <https://www.alertlogic.com/solutions/log-correlation-and-analysis/>.

"Manage IBM AS400 Logs with Eventlog Analyzer", ManageEngine, Log Management and Reporting Software to analyze IBM AS/400 Logs, 4 pages, printed on Apr. 1, 2016, <https://www.manageengine.com/products/eventlog/ibm-as-400-log-management.html>.

"What's the fastest-growing use of machine data?", TIBCO LogLogic®, Log Data and Machine Data Management and Analysis, 4 pages, printed on Apr. 1, 2016, Copyright © 2016 TIBCO Software Inc., <http://www.tibco.com/products/event-processing/loglogic-for-machine-data>.

Lurie, A., "Top 47 Log Management Tools", on May 19, 2014, in Cloud Computing, ProfitBricks Blog—Cloud Computing and IaaS Blog, 43 pages, printed on Apr. 1, 2016, <https://blog.profitbricks.com/top-47-log-management-tools/>.

Martin, G., "Open-Source Centralzied Log Management", Greg Martin's blog—InfoSecurity 2.0, Aug. 19, 2012, 2 pages, printed on Apr. 1, 2016, <http://infosec20.blogspot.in/2012/08/open-source-centralized-log-management.html>.

Weinberger, M., "Build Your Own Splunk-Like Central Log Management Tool With Open Source Software", SiliconANGLE, Jun 18, 2012, 2 pages, printed on Apr. 1, 2016, <http://siliconangle.com/blog/2012/06/18/build-your-own-splunk-like-central-log-management-tool-with-open-source-software/>.

IBM Appendix P., "List of IBM Patents or Patent Applications to be Treated as Related", Dated Herewith, 2 pages.

\* cited by examiner

POLICY BASED DYNAMIC DATA COLLECTION FOR PROBLEM ANALYSIS

BACKGROUND

The present invention relates generally to data collection and in particular to collecting data for problem analysis.

Generally, operating systems, software frameworks, and programs include a logging system, which generates a log file including log entries. Each log entry includes information related to an event that occurs during the operation of a computer system. A log file may include voluminous event data over thousands of lines and originating from a multitude of sources. Logging systems typically append to logs to as events occur, so the log entries are typically ordered chronologically. Primarily, log files provide users with a diagnostic audit trail of a system and to diagnose problems. More recently, log files also serve various additional functions, such as optimizing system and network performance, recording the actions of users, and providing data that is useful for investigating malicious activity.

SUMMARY

A computer-implemented method includes receiving, from a first log agent, a first log collection. The first log collection includes one or more log entries. The computer-implemented method further includes receiving a first policy. The first policy includes a definition of a first pattern and a definition of a procedure. The computer-implemented method further includes scanning the first log collection against the first policy to determine a match between a portion of the first log collection and the first pattern, with the matching portion of the first log collection being identified as a first data artefact. The computer-implemented method further includes, responsive to identifying the first data artefact, executing the procedure defined by the first policy, wherein the procedure includes: filtering the first log collection to yield a first group of filtered log entries, receiving a first data collection, wherein the first data collection includes metadata associated with the first group of filtered log entries, and sending the first group of filtered log entries and the first data collection to a recipient system. A corresponding computer system and computer program product are also disclosed.

DETAILED DESCRIPTION

Figure 1:
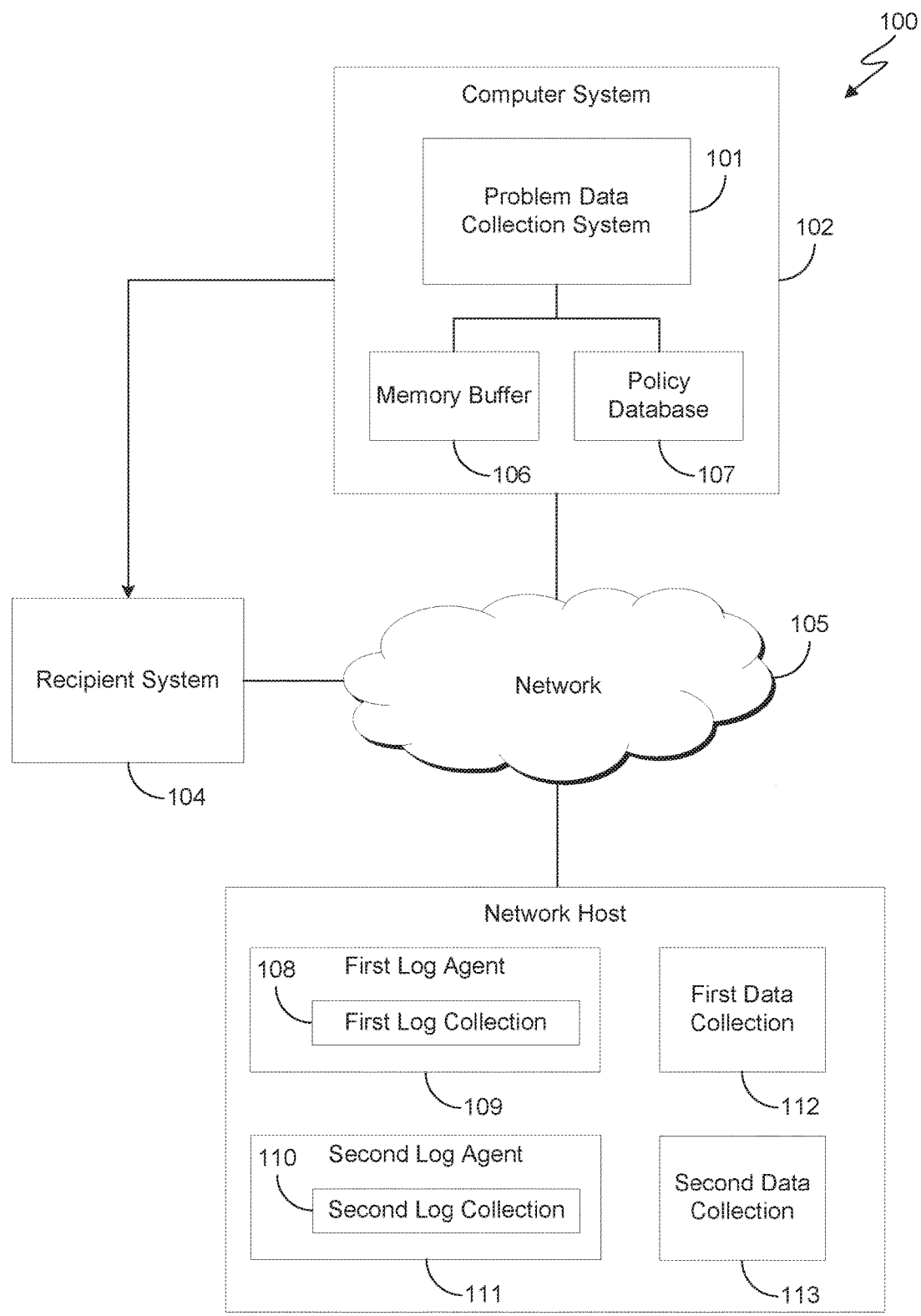
FIG. 1 is a functional block diagram of a computing environment suitable for operation of a problem data collection program in accordance with at least one embodiment of the invention.

Many of the sources from which log entries are generated from run continuously. Here, log entries are also generated on a constant basis. However, some sources from which log entries are generated from run periodically. In this case, log entries are generated in batches at regular intervals of time. Regardless of how the log entries are generated though, the inventors have observed and/or recognized that aggregating, archiving, and distributing the data associated with the log entries (e.g., manually or through computer programming) is expensive and time consuming. The inventors have further observed and/or recognized that the untimely distribution of data is problematic for individuals and businesses who need continuous and instant access to real-time and historical data. The inventors have further observed and/or recognized that as the size of network systems continue to increase, and thus the number of storage locations for the log entries, the ability to meet the demands for secure, reliable storage and retrieval of the information associated with the log entries has become problematic.

A common approach to this problem has been to setup a centralized logging framework, wherein multiple log entries can be aggregated in a central location. Within this centralized logging framework, log collecting agents are installed and configured on various host systems to collect all of the log entries. The log collecting agents further have mechanisms to filter the log content. The resulting filtered content of the log entries, often including "ERROR" messages, "WARNING" messages, "INFO" messages, "DEBUG" messages, etc. is then forwarded to a cluster of collectors, which in turn normalize the data associated with the logs and transmit the normalized logs to a scalable centralized logging database for storage and analysis. The inventors have further observed and/or recognized that as the number of systems grow to include multiple hosts with multiple applications and middleware components, managing and accessing all of the log entries from this centralized logging framework requires an increase in the amount of hardware (i.e., storage devices, networks, processors, etc.) needed to store and analyze the log entries. The inventors have further observed and/or recognized that managing and analyzing the large amount of data associated with all of the log entries located in the centralized logging framework is time consuming.

A further approach to this problem includes adjusting the mechanisms that filter the log content to only collect certain content (e.g., only "ERROR" messages or only "WARNING" messages). By doing so, the amount of hardware required to store the log entries, as well as the time necessary to manage and analyze the log content is decreased. However, the inventors have further observed and/or recognized that by filtering the log content to only collect certain content, all of the information necessary to analyze the root cause of a system problem is no longer available. In this case, the entire log collection process may have to be re-run to collect information that was previously filtered.

The inventors have further observed and/or recognized that when a problem ticket is raised by a customer of a service, a support engineer often has to interact with the customer on multiple occasions to collect the necessary environment specific details to properly analyze the reason for a system failure. This back and forth process of collecting information from a customer is tedious, error prone, and time consuming. Various embodiments of the present invention may address or improve upon some or all of the aforementioned problems or disadvantages, however it will be understood that addressing any particular problem or disadvantage is not a necessary requirement for the practice of all embodiments of the present invention.

Referring now to various embodiments of the invention in more detail, FIG. 1 is a functional block diagram of a computing environment, generally designated 100, suitable for operation of a problem data collection program (hereinafter, "PDC" program) in accordance with at least one embodiment of the invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes computer system 102, network host 103, and recipient system 104 interconnected over network 105. Network 105 can be, for example, a telecommunications network, a local area network (LAN), a wide area network (WAN), such as the Internet, or a combination of the three, and can include wired, wireless, or fiber optic connections. Network 105 may include one or more wired and/or wireless networks that are capable of receiving and transmitting data, voice, and/or video signals, including multimedia signals that include voice, data, and video information. In general, network 105 may be any combination of connections and protocols that will support communications between computer system 102, network host 103, recipient system 104, and other computing devices (not shown) within distributed data processing environment 100.

Figure 3:
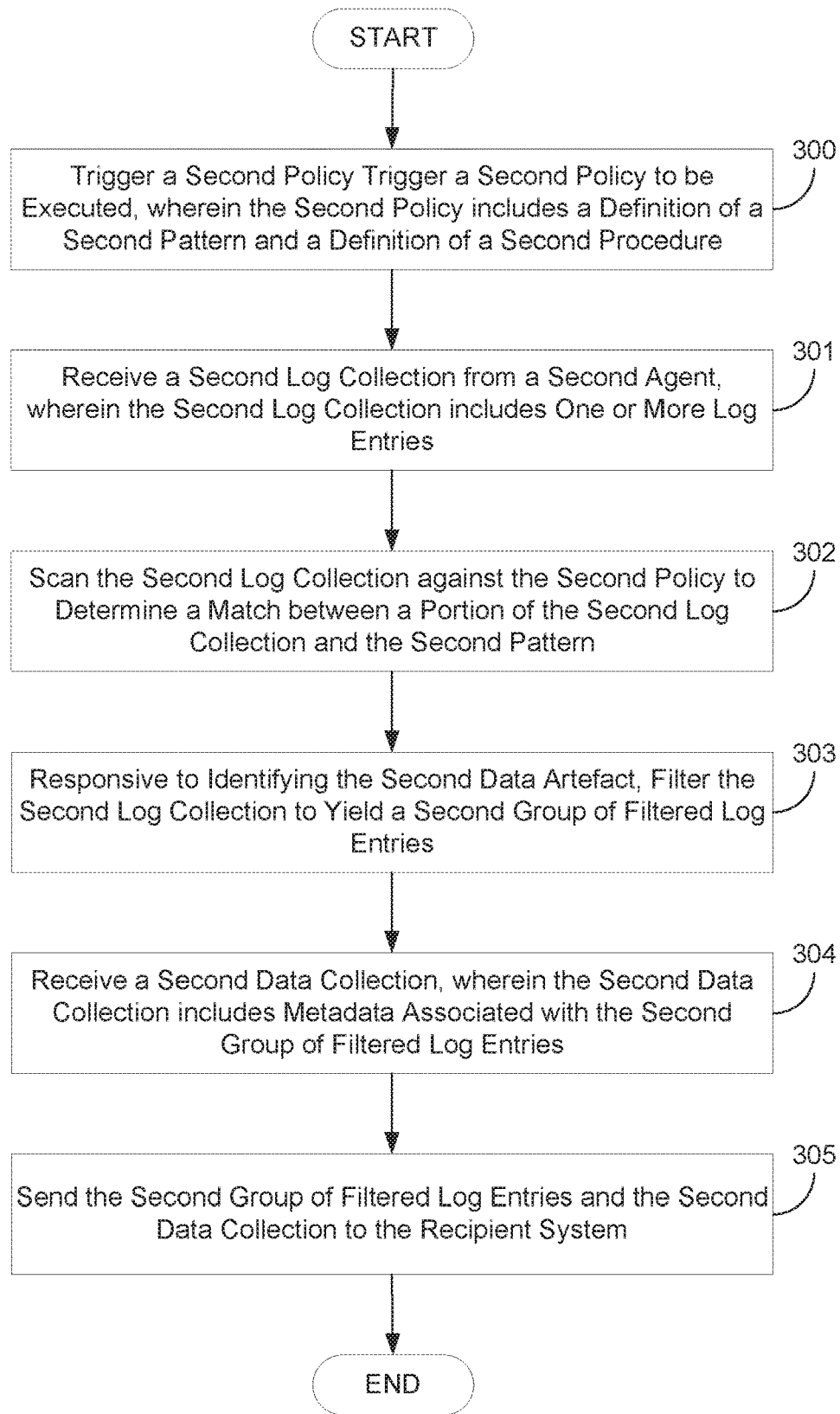
FIG. 3 is a flow chart diagram depicting operational steps for a problem data collection program in accordance with at least one embodiment of the invention.

Computer system 102 can be a standalone computing device, a management server, a web server, a mobile computing device, or any other electronic device or computing system capable of receiving, sending, and processing data. In other embodiments, computer system 102 can represent a server computing system utilizing multiple computers as a server system, such as in a cloud computing environment. In an embodiment, computer system 102 represents a computing system utilizing clustered computers and components (e.g., database server computers, application server computers, etc.) that act as a single pool of seamless resources when accessed within distributed data processing environment 100. Computer system 102 includes PDC program 101, memory buffer 106, and policy database 107 communicatively coupled to computer system 102. In an embodiment of the invention, memory buffer 106 is a circular memory buffer that acts as temporary storage for a first log collection 108 collected by a first log agent 109 and/or a second log collection 110 collected by a second log agent 111 located on a system (e.g., an operating system, virtual machine, etc.), software component (e.g., an application, middleware, etc.), or database of network host 103. Policy database 107 includes one or more policies. More specifically, each policy includes a definition of a first pattern and a definition of a procedure to be executed by PDC program 101. Although memory buffer 106 and policy database 107 are depicted in FIG. 1 as being integrated with computer system 102, in some embodiments, memory buffer 106 and policy database 107 may be remotely located from computer system 102. Computer system 102 may include internal and external hardware components, as depicted and described in further detail with respect to FIG. 3.

Recipient system 104 includes log entries filtered from first log collection 108 and/or second log collection 110, as well metadata associated with the filtered log entries. Recipient system 104 can be a standalone computing device, a management server, a web server, or any other electronic device capable of receiving, sending, and processing data. In an embodiment of the invention, recipient system 104 is a server in a client-server model.

Figure 2:
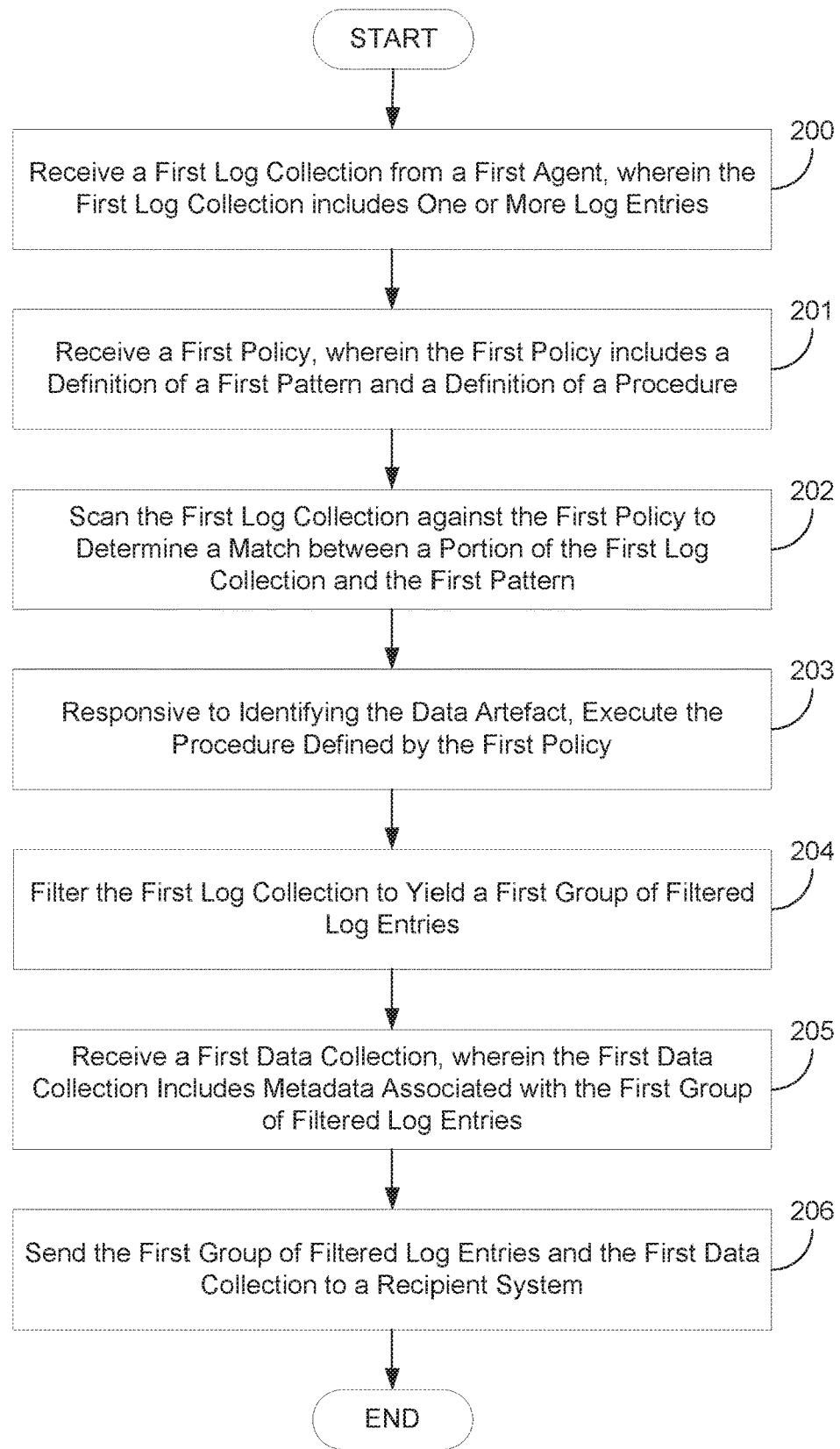
FIG. 2 is a flow chart diagram depicting operational steps for a problem data collection program in accordance with at least one embodiment of the invention.

FIG. 2 is a flow chart diagram depicting operational steps for a PDC program in accordance with at least one embodiment of the invention. At step 200, PDC program 101 may receive a first log collection 108 from a first log agent 109. First log collection 108 includes one or more log entries. A log entry may generally be understood as a record of information related to an event that occurred during the operation of a system (e.g., an operating system, virtual machine, etc.), software component (e.g., an application, middleware, etc.), or database. Generally, a log entry may include information such as the date and time of the event, an event message (e.g., "Retrying request from the application source"), the type of log entry (e.g., "INFO", "WARNING", "ERROR", "DEBUG", etc.), and the source from which the event occurred. PDC program 101 may receive log entries from any number of log agents (e.g., IBM Tivoli Monitoring Log File Agent) installed on a system, software component or database of network host 103 and configured to transmit log entries to be temporarily stored in memory buffer 106. In an embodiment of the invention, the one or more log entries included in the first log collection are stored in a circular memory buffer.

At step 201, PDC program 101 may receive a first policy, wherein the first policy includes a definition of a first pattern and a definition of a procedure. A pattern may generally be understood as a particular arrangement of data (i.e., text string).

At step 202, PDC program 101 may scan first log collection 108 against the first policy to determine a match between a portion of first log collection 108 and the first pattern. Here, the matching portion of first log collection 108 may be identified as a first data artefact. A data artefact may generally be understood as a particular pattern of data (i.e., text string) contained in a log entry of first log collection 108. PDC program 101 may match a data artefact to a pattern by any generally known pattern matching methods, such as regular expressions (i.e., regex or regexp). A regular expression is a text string for describing a search pattern. For example, policy database 107 may include the policy "Policy_CTGPD_MessageID". The policy "Policy_CTGPD_MessageID" may further include the first pattern "CTGPD\[0-9]+E*". Here, PDC program 101 will search for any data artefacts that contain a "MessageID" starting with "CTGPD", having any digits thereafter composed from the numbers (0-9), and ending with the letter "E". As each newly collected log entry is stored in memory buffer 106, PDC program 101 will scan the log entry to determine whether a match exists between a data artefact and the first pattern of the first policy. For example, PDC program 101 may scan one or more log entries to identify the first data artefact "CTGPD6035E" by matching the data artefact "CTGPD6035E" to the first pattern "CTGPD\[0-9]+E*". It should be appreciated that PDC program 101 may match any number of data artefacts to any number of patterns defined by the policies stored in policy database 107.

In an embodiment of the invention, PDC program 101 may match a data artefact to a pattern by any generally by any generally known approximate string matching methods (i.e., fuzzy string searching), such as edit distance. Here, the closeness of a match between a text string and a pattern is measured in terms of the number of primitive operations necessary to convert the string into an exact match. For example, PDC program 101 may identify a first data artefact by matching the data artefact "java\Jang\. OutOfMemoryError" to the first pattern "java\.language\. OutOfMemoryError:\s*" defined by the policy "Policy OutOfMemoryError".

At step 203, responsive to identifying the first data artefact, PDC program 101 may execute the procedure defined by the first policy. More specifically, the procedure defined by the first policy is automatically executed when the first data artefact is identified. For example, PDC program 101 may identify the first data artefact "StaleConnectionException: COM.ibm.db2.jdbc.DB2Exception" by matching the data artefact "StaleConnectionException: COM.ibm.db2.jdbc.DB2Exception" to the first pattern "StaleConnectionException\.*". Based on identifying this data artefact, PDC program 101 will automatically execute a procedure defined by the first policy "Policy_WAS_StaleConnectionException_DB2Exception" stored in policy database 107.

At step 204, the procedure defined by the first policy includes filtering first log collection 108 stored in memory buffer 106 to yield a first group of filtered log entries. For example, each log entry may include the following log content: the date and time of the event, an event message (e.g., "Retrying request from the application source using HTTP get method), the type of log entry (e.g., "INFO", "WARNING", "ERROR", "DEBUG", etc.), and the source from which the event occurred. According to the procedure of the first policy "Policy_WAS_ Stale Connection Exception_DB2Exception", PDC program 101 will filter first log collection 108 to yield a first group of log entries having the log entry type "INFO". In an embodiment of the invention, first log collection 108 is filtered for a period of time according to the procedure defined by the first policy. More specifically, PDC program 101 may filter first log collection 108 for a period of time prior to and/or after identifying the first data artefact contained in a log entry of first log collection 108. For example, according to the procedure defined by the first policy "Policy_WAS_StaleConnectionException_DB2Exception", upon identifying the data artefact "StaleConnectionException: COM.ibm.db2.jdbc.DB2Exception", PDC program 101 will filter first log collection 108 for fifteen seconds prior to and ten seconds after the log entry containing the first data artefact "StaleConnectionException: COM.ibm.db2.jdbc.DB2Exception" to yield a first group of filtered log entries having the log entry type "DEBUG". In another example, according to the procedure defined by the first policy "Policy_ConnectException", upon identifying the first data artefact "java\.net\.ConnectException", PDC program 101 will filter first log collection 108 for ten seconds prior to the log entry containing the first data artefact "java\.net\.ConnectException" to yield a first group of filtered log entries having the log entry type "ERROR".

At step 205, the procedure defined by the first policy includes receiving a first data collection 112. More specifically, first data collection 112 includes metadata associated with the first group of filtered log entries. Metadata may generally be understood as additional information (e.g., configuration files, environment details, information obtained by running operating system commands, etc.) necessary to analyze the first group of filtered log entries. For example, according to the procedure defined by the first policy "Policy_WAS_StaleConnectionException_DB2Exception", PDC program 101 will receive a first data collection in the form of "properties details" from network host 103 running a WebSphere Application Server ("WAS"). PDC program 101 may receive first data collection 112 by running any generally known operating system commands on network host 103 (e.g., "GET APPLICATION SERVER PROPERTIES").

At step 206, according to the procedure defined by the first policy, PDC program 101 may send the first group of filtered log entries and first data collection 112 to recipient system 104. It should be appreciated that the data included in the first group of filtered log entries and first data collection 112 may originate from any number of systems, software components, and databases connected to computer system 102 via network 106.

In an alternative embodiment, at step 300, executing the procedure defined by the first policy further includes triggering a second policy to be executed. More specifically, the second policy includes a definition of a second pattern and a definition of a procedure. The second policy is automatically triggered when the first data artefact is matched to the first policy. For example, according to the previously mentioned first policy "Policy_WAS_Stale Connection Exception_DB2Exception", PDC program 101 will trigger the second policy "Policy_Policy_DB2Diag_DIA4701E" to be executed.

At step 301, the procedure defined by the second policy includes PDC program 101 receiving, from a second log agent 111, a second log collection 110. Second log collection 110 includes one or more log entries. In an embodiment of the invention, first log agent 109 and second log agent 111 are from different data sources. For example, first log agent 109 may collect log entries from a web application server, such as IBM Web Sphere® Application Server ("WAS"). Similarly, second log agent 111 may collect log entries from a relational database management system ("RDMS"), such as IBM DB2®. It should be appreciated that first log agent 109 and second log agent 111 may be installed on any number of different systems.

At step 302, the procedure defined by the second policy further includes scanning second log collection 110 against the second policy to determine a match between a portion of second log collection 113 and the second pattern. Here, the matching portion of second log collection 110 may be identified as a second data artefact. For example, according to the procedure defined by the second policy "Policy_Policy_DB2Diag_DIA4701E", PDC program 101 may scan the log entries to identify the second data artefact "DIA4701E" by matching the data artefact "DIA4701E" to the second pattern "DIA4701W\s(*)".

At step 303, responsive to identifying the second data artefact, the procedure defined by the second policy further includes filtering second log collection 110 stored in memory buffer 106 to yield a second group of filtered log entries. In an embodiment of the invention, second log collection 110 is filtered for a period of time according to the procedure defined by the second policy. More specifically, PDC program 101 may filter first log collection 108 for a period of time prior to and/or after identifying the second data artefact contained in a log entry of second log collection 110. For example, according to the previously mentioned second policy "Policy_Policy_DB2Diag_DIA4701E", upon identifying the second data artefact "DIA4701E", PDC program 101 will filter second log collection 110 for twenty seconds prior to the log entry containing the second data artefact to yield a second group of filtered log entries having the log entry type "DEBUG".

At step 304, the procedure defined by the second policy further includes receiving a second data collection 113. More specifically, second data collection 113 includes metadata associated with the second filtered log content. For example, according to the procedure defined by the second policy "Policy_Policy_DB2Diag_DIA4701E", PDC program 101 will receive DB2 "connection configuration details" from the file system for network host 103 running DB2. PDC program 101 may receive the second data collection by running any generally known operating system commands via network host 103 (e.g., "GET DATABASE CONFIGURATION", "GET CONNECTION STATE", etc.).

At step 305, the procedure defined by the second policy further includes sending the second group of filtered log entries and second data collection 113 to recipient system 104. It should be appreciated that the data included in the second group of filtered log entries and second data collection 113 may originate from any number of systems, software components, and databases connected to computer system 102 via network 105.

It should be appreciated that various embodiments of the invention may provide one or more of the following advantages:
(i) ability to dynamically perform further data collection (i.e., first data collection, second data collection, etc.) from various sources (e.g., application configurations and properties, system events, operating system configurations, etc.) to supplement the log entries that are sent to the centralized logging database to ensure that complete and relevant data is available to analyze a system problem;
(ii) ability to retrieve and analyze log information and metadata associated with the log information from distributed systems before sending the log information and metadata to the centralized logging database;
(iii) ability to identify complex and specific problem data without the need to send large amounts of data to the centralized logging database;
(iv) ability to trigger a second policy across a distributed environment based on a first policy;
(v) ability to retrieve and transmit log information and metadata associated with the log information on an as need basis, rather than retrieving all of the log information at once and then filtering the log information for relevant data;
(vi) decrease in the amount of hardware (i.e., storage devices, networks, processors, etc.) needed to store and analyze the log entries.

The aforementioned advantages need to necessarily be present in any given embodiment for the invention to be practiced.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Some embodiments of the present invention may include one, or more, of the following features, characteristics, operations and/or advantages: (i) performance of policy based dynamic and distributed problem data (for example, log and non-log) collection; (ii) monitoring of logs and events to identify specific patterns or events; (iii) application of policies on log and event information to identify specific patterns; (iv) facilitates distributed data collection through a triggered policy; (v) emitting an event based on a triggered policy to a distributed system for further processing; (vi) performance of on-demand dynamic distributed data collection based on an emitted event; (vii) application of specific data filters based on a triggered policy; (viii) dynamically collection of further information based on a triggered policy and incoming data; and/or (ix) application of a policy to perform further data collection when triggered from any source.

Some embodiments of the present invention may include one, or more, of the following features, characteristics, operations and/or advantages: (i) evaluation of the log messages and perform additional data (for example, log and non-log) collection and sending the appropriate data to a centralized log server based on a policy defined for the data collection, wherein the policy for data collection contains rules to be used based on some specific pattern identified from the log content and how much additional data (log and non-log) has to be chosen for sending to log server; (ii) analysis and evaluation policies on the initially collected data and emit events to indicate further specific data collection is required; (iii) act on emitted events to perform further (non)distributed collection of log and non log data on demand; (iv) collection of all log messages and write in a rotating memory buffer before sending the messages to the centralized server; and/or (v) processing collected information, emitting events from the collection and then doing further post collection after analyzing what was collected.

Figure 4:
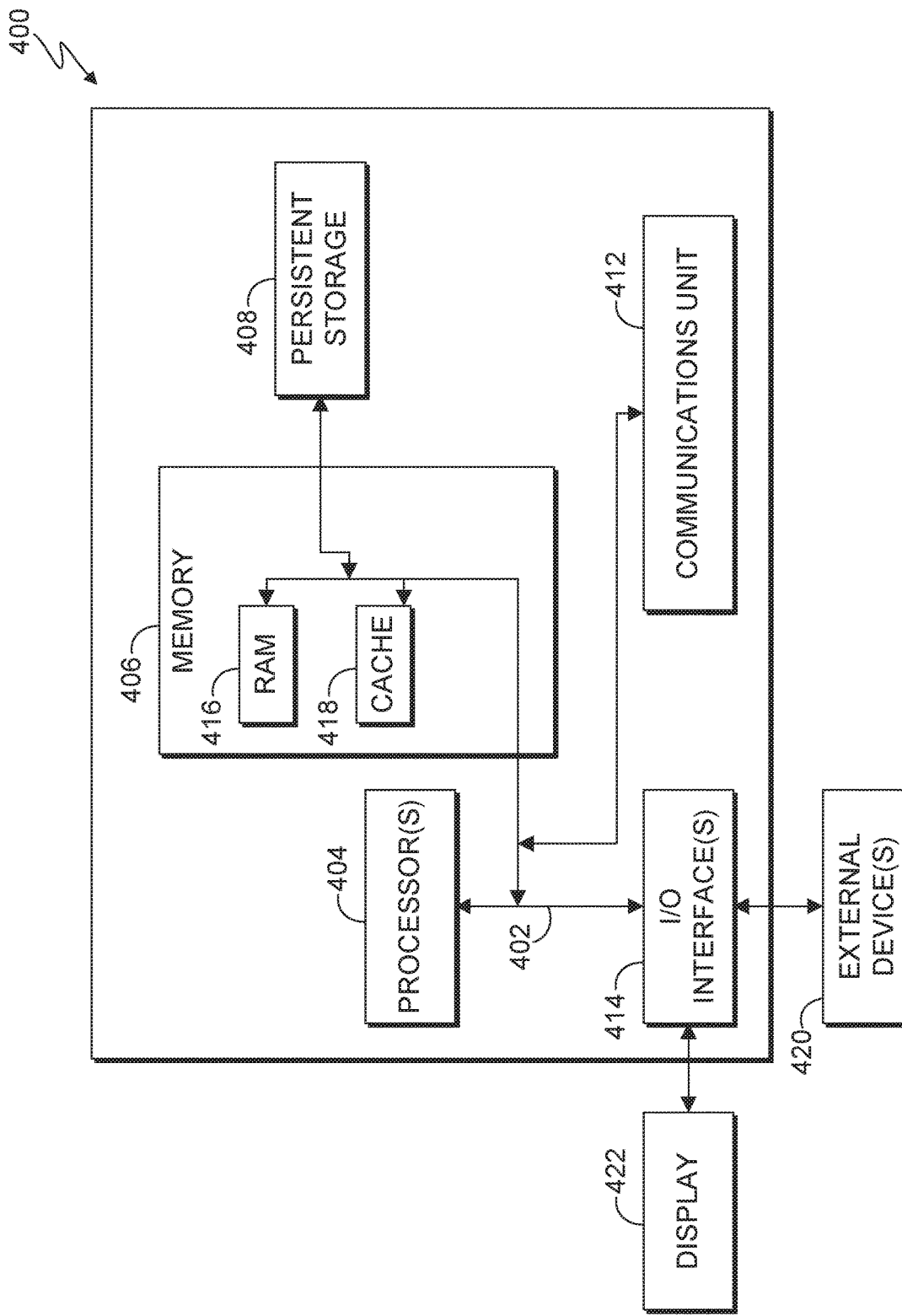
FIG. 4 is a block diagram depicting components of a computer suitable for executing a problem data collection program in accordance with at least one embodiment of the invention.

FIG. 4 is a block diagram depicting components of a computer 400 suitable for executing the PDC program 101. FIG. 4 displays the computer 400, the one or more processor(s) 404 (including one or more computer processors), the communications fabric 402, the memory 406, the RAM 416, the cache 418, the persistent storage 408, the communications unit 412, the I/O interfaces 414, the display 422, and the external devices 420. It should be appreciated that FIG. 4 provides only an illustration of one embodiment and does not imply any limitations with regard to the environments in which different embodiments may be implemented. Many modifications to the depicted environment may be made.

As depicted, the computer 400 operates over a communications fabric 402, which provides communications between the computer processor(s) 404, memory 406, persistent storage 408, communications unit 412, and input/output (I/O) interface(s) 414. The communications fabric 402 may be implemented with any architecture suitable for passing data or control information between the processors 404 (e.g., microprocessors, communications processors, and network processors), the memory 406, the external devices 420, and any other hardware components within a system. For example, the communications fabric 402 may be implemented with one or more buses.

The memory 406 and persistent storage 408 are computer readable storage media. In the depicted embodiment, the memory 406 comprises a random access memory (RAM) 416 and a cache 418. In general, the memory 406 may comprise any suitable volatile or non-volatile one or more computer readable storage media.

Program instructions for the PDC program 101 may be stored in the persistent storage 408, or more generally, any computer readable storage media, for execution by one or more of the respective computer processors 404 via one or more memories of the memory 406. The persistent storage 408 may be a magnetic hard disk drive, a solid state disk drive, a semiconductor storage device, read-only memory (ROM), electronically erasable programmable read-only memory (EEPROM), flash memory, or any other computer readable storage media that is capable of storing program instructions or digital information.

The media used by the persistent storage 406 may also be removable. For example, a removable hard drive may be used for persistent storage 408. Other examples include optical and magnetic disks, thumb drives, and smart cards that are inserted into a drive for transfer onto another computer readable storage medium that is also part of the persistent storage 408.

The communications unit 412, in these examples, provides for communications with other data processing systems or devices. In these examples, the communications unit 412 may comprise one or more network interface cards. The communications unit 412 may provide communications through the use of either or both physical and wireless communications links. In the context of some embodiments of the present invention, the source of the various input data may be physically remote to the computer 400 such that the input data may be received and the output similarly transmitted via the communications unit 412.

The I/O interface(s) 414 allow for input and output of data with other devices that may operate in conjunction with the computer 400. For example, the I/O interface 414 may provide a connection to the external devices 420, which may be as a keyboard, keypad, a touch screen, or other suitable input devices. External devices 420 may also include portable computer readable storage media, for example thumb drives, portable optical or magnetic disks, and memory cards. Software and data used to practice embodiments of the present invention may be stored on such portable computer readable storage media and may be loaded onto the persistent storage 408 via the I/O interface(s) 414. The I/O interface(s) 414 may similarly connect to a display 422. The display 422 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of computer program instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
receiving a first policy, wherein the first policy comprises a definition of a first pattern and a definition of a first procedure;
scanning a first log collection against the first policy to determine a match between a portion of a first log entry included in the first log collection and the first pattern, with the matching portion of the first log entry being identified as a first data artefact; and
responsive to identifying the first data artefact, executing the first procedure defined by the first policy, wherein the first procedure comprises:
filtering the first log collection between (i) a first predetermined amount of time earlier than a time the first data artefact is identified and (ii) a second predetermined amount of time later than a time the first data artefact is identified to yield a first group of filtered log entries;
receiving a first data collection, wherein the first data collection comprises metadata associated with the first group of filtered log entries;
sending the first group of filtered log entries and the first data collection to a recipient system; and
triggering a second policy to be executed based, at least in part, on executing the first procedure, wherein the second policy comprises a definition of a second pattern and a definition of a second procedure;
executing the second procedure of the second policy, wherein the second procedure comprises:
scanning a second log collection against the second policy to determine a match between a portion of a second log entry included in the second log collection and the second pattern, with the matching portion of the second entry being identified as a second data artefact; and
responsive to identifying the second data artefact:
filtering the second log collection between (i) a first predetermined amount of time earlier than a time the second data artefact is identified and (ii) a second predetermined amount of time later than a time the second data artefact is identified to yield a second group of filtered log entries;
receiving a second data collection, wherein the second data collection comprises metadata associated with the second group of filtered log entries, and
sending the second group of filtered log entries and the second data collection to the recipient system.

* * * * *